US012026525B2

(12) United States Patent
Copeland

(10) Patent No.: US 12,026,525 B2
(45) Date of Patent: Jul. 2, 2024

(54) DYNAMIC DASHBOARD ADMINISTRATION

(71) Applicant: Accenture Global Solutions Limited, Dublin (IE)

(72) Inventor: Shannon Copeland, Atlanta, GA (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 17/453,676

(22) Filed: Nov. 5, 2021

(65) Prior Publication Data
US 2023/0141296 A1     May 11, 2023

(51) Int. Cl.
G06F 9/451 (2018.01)
G06F 3/0484 (2022.01)
G06F 3/04883 (2022.01)
G06F 16/901 (2019.01)
G06F 3/16 (2006.01)

(52) U.S. Cl.
CPC ............ G06F 9/451 (2018.02); G06F 3/0484 (2013.01); G06F 3/04883 (2013.01); G06F 16/9024 (2019.01); G06F 3/167 (2013.01)

(58) Field of Classification Search
CPC .... G06F 9/451; G06F 3/0484; G06F 3/04883; G06F 16/9024; G06F 3/167
See application file for complete search history.

(56) References Cited

U.S. PATENT DOCUMENTS

| 6,785,380 | B2 | 8/2004 | Ribera |
| 6,829,603 | B1 | 12/2004 | Chai et al. |
| 7,275,083 | B1 | 9/2007 | Seibel et al. |
| 7,486,785 | B2 | 2/2009 | Flores |
| 8,108,237 | B2 | 1/2012 | Bourne et al. |
| 8,332,279 | B2 | 12/2012 | Woolston |
| 8,411,843 | B1 | 4/2013 | Cyriac |
| 9,049,295 | B1 | 6/2015 | Cooper |
| 9,165,556 | B1 | 10/2015 | Sugar |

(Continued)

FOREIGN PATENT DOCUMENTS

| KR | 1020180058877 | 7/2018 |
| WO | WO 2016139666 | 9/2016 |
| WO | WO 2018020517 | 2/2018 |

OTHER PUBLICATIONS

CSS-Tricks.com [online], "JavaScript Event Madness! Capturing *all* events without interference," Jul. 28, 2014, retrieved on Mar. 1, 2022, retrieved from URL<https://css-tricks.com/capturing-all-events/>, 5 pages.

(Continued)

Primary Examiner — Tan H Tran
(74) Attorney, Agent, or Firm — Fish & Richardson P.C.

(57) ABSTRACT

Methods and systems for dynamic dashboard administration are presented. Embodiments include displaying a dashboard through a graphical user interface ('GUI'); receiving user instructions to manipulate one or more elements of the dynamic dashboard; capturing the manipulation of the one or more GUI elements; parsing, according to a gesture taxonomy and gesture ontology, the captured manipulation into one or more gesture triples; storing the gesture triples in an enterprise knowledge graph of a semantic graph database; identifying, in dependence upon the gesture triples, dashboard insights; updating the dashboard in accordance with the dashboard insights.

18 Claims, 8 Drawing Sheets

(56) References Cited

U.S. PATENT DOCUMENTS

| | | |
|---|---|---|
| 9,848,082 B1 | 12/2017 | Lilland |
| 9,860,391 B1 | 1/2018 | Wu et al. |
| 9,936,066 B1 | 4/2018 | Mammen et al. |
| 9,942,779 B1 | 4/2018 | Proctor |
| 9,948,783 B1 | 4/2018 | Farrell |
| 10,026,092 B2 | 7/2018 | Heater et al. |
| 10,057,423 B1 | 8/2018 | Sheikh |
| 10,101,976 B2 | 10/2018 | Cavalcante |
| 10,303,466 B1 | 5/2019 | Karman |
| 10,482,384 B1 | 11/2019 | Stoilos |
| 10,623,572 B1* | 4/2020 | Copeland ............ H04M 3/5191 |
| 11,216,160 B2* | 1/2022 | Green ............ H04N 21/42222 |
| 2003/0069780 A1 | 4/2003 | Hailwood et al. |
| 2003/0126136 A1 | 7/2003 | Omoigui |
| 2004/0143473 A1 | 7/2004 | Tivey et al. |
| 2004/0210881 A1 | 10/2004 | Friedman |
| 2005/0005266 A1 | 1/2005 | Datig |
| 2005/0044357 A1 | 2/2005 | Fano |
| 2005/0105712 A1 | 5/2005 | Williams et al. |
| 2006/0095273 A1 | 5/2006 | Montvay et al. |
| 2006/0098625 A1 | 5/2006 | King |
| 2006/0239439 A1 | 10/2006 | Blackwood |
| 2007/0019618 A1 | 1/2007 | Shaffer |
| 2007/0064913 A1 | 3/2007 | Shaffer |
| 2007/0094183 A1 | 4/2007 | Paek et al. |
| 2007/0233561 A1 | 10/2007 | Golec |
| 2007/0233730 A1 | 10/2007 | Johnston |
| 2008/0162498 A1 | 7/2008 | Omoigui |
| 2008/0275744 A1 | 11/2008 | MacIntyre et al. |
| 2009/0024944 A1* | 1/2009 | Louch ............ G06F 9/44505 715/764 |
| 2009/0070322 A1 | 3/2009 | Salvetti |
| 2009/0132474 A1 | 5/2009 | Ma |
| 2009/0245500 A1 | 10/2009 | Wampler |
| 2009/0271192 A1 | 10/2009 | Marquette |
| 2010/0010802 A1 | 1/2010 | Ruano |
| 2010/0036788 A1 | 2/2010 | Wu |
| 2010/0057646 A1* | 3/2010 | Martin ............ G16H 15/00 706/11 |
| 2010/0063799 A1 | 3/2010 | Jamieson |
| 2010/0114563 A1 | 5/2010 | Choi |
| 2011/0077999 A1 | 3/2011 | Becker et al. |
| 2011/0082829 A1 | 4/2011 | Kolovski |
| 2011/0113094 A1 | 5/2011 | Chunilal |
| 2011/0206198 A1 | 8/2011 | Freedman |
| 2011/0264451 A1 | 10/2011 | Hoepfinger |
| 2012/0059776 A1 | 3/2012 | Estes |
| 2012/0078636 A1 | 3/2012 | Ferrucci |
| 2012/0233558 A1 | 9/2012 | Naim |
| 2012/0275642 A1 | 11/2012 | Aller |
| 2012/0303355 A1 | 11/2012 | Liu et al. |
| 2013/0091090 A1 | 4/2013 | Spivack et al. |
| 2013/0006916 A1 | 6/2013 | McBride |
| 2013/0163731 A1 | 6/2013 | Yan |
| 2013/0174047 A1* | 7/2013 | Sivakumar ............ G06F 9/451 715/746 |
| 2013/0204663 A1 | 8/2013 | Kahlow |
| 2014/0022328 A1 | 1/2014 | Gechter et al. |
| 2014/0081585 A1 | 3/2014 | Cappucino et al. |
| 2014/0081934 A1 | 3/2014 | Mizell |
| 2014/0122535 A1 | 5/2014 | Gerard |
| 2014/0164502 A1 | 6/2014 | Khodorenko |
| 2014/0189680 A1 | 7/2014 | Kripalani |
| 2014/0201234 A1 | 7/2014 | Lee et al. |
| 2014/0270108 A1 | 9/2014 | Riahi et al. |
| 2014/0278343 A1 | 9/2014 | Tran |
| 2014/0314225 A1 | 10/2014 | Riahi |
| 2014/0372630 A1 | 12/2014 | Bostick |
| 2014/0379755 A1 | 12/2014 | Kuriakose |
| 2015/0012350 A1 | 1/2015 | Li et al. |
| 2015/0066479 A1 | 3/2015 | Pasupalak |
| 2015/0067531 A1* | 3/2015 | Adimatyam ....... G06Q 30/0621 715/745 |
| 2015/0112756 A1 | 4/2015 | Subramanian et al. |
| 2015/0170163 A1 | 6/2015 | Wagner et al. |
| 2015/0189085 A1 | 7/2015 | Riahi et al. |
| 2015/0201077 A1 | 7/2015 | Konig et al. |
| 2015/0242410 A1 | 8/2015 | Pattabhiraman et al. |
| 2015/0254234 A1 | 9/2015 | Dixit et al. |
| 2015/0261743 A1 | 9/2015 | Sengupta |
| 2015/0294405 A1 | 10/2015 | Hanson |
| 2015/0309994 A1 | 10/2015 | Liu |
| 2015/0348551 A1 | 12/2015 | Gruber |
| 2015/0379603 A1 | 12/2015 | Gupta |
| 2016/0019882 A1 | 1/2016 | Matula |
| 2016/0021181 A1 | 1/2016 | Ianakiev et al. |
| 2016/0034457 A1 | 2/2016 | Bradley |
| 2016/0036981 A1 | 2/2016 | Hollenberg |
| 2016/0036982 A1 | 2/2016 | Ristock |
| 2016/0036983 A1 | 2/2016 | Korolev |
| 2016/0117593 A1 | 4/2016 | London |
| 2016/0125364 A1 | 5/2016 | Field et al. |
| 2016/0162913 A1 | 6/2016 | Linden et al. |
| 2016/0171099 A1 | 6/2016 | Lorge et al. |
| 2016/0171511 A1 | 6/2016 | Goel et al. |
| 2016/0188686 A1 | 6/2016 | Hopkins |
| 2016/0189028 A1 | 6/2016 | Hu et al. |
| 2016/0217479 A1 | 7/2016 | Kashyap et al. |
| 2016/0232540 A1 | 8/2016 | Gao et al. |
| 2016/0239851 A1 | 8/2016 | Tanner |
| 2016/0162474 A1 | 9/2016 | Agarwal |
| 2016/0321748 A1 | 11/2016 | Mahatm |
| 2016/0335544 A1 | 11/2016 | Bretschneider et al. |
| 2017/0006135 A1 | 1/2017 | Siebel et al. |
| 2017/0017694 A1 | 1/2017 | Roytman et al. |
| 2017/0024375 A1 | 1/2017 | Hakkani-Tur |
| 2017/0091390 A1 | 3/2017 | Joul |
| 2017/0124193 A1 | 5/2017 | Li |
| 2017/0147635 A1 | 5/2017 | McAteer et al. |
| 2017/0154108 A1 | 6/2017 | Li et al. |
| 2017/0177715 A1 | 6/2017 | Chang |
| 2017/0200220 A1 | 7/2017 | Nicholson |
| 2017/0195488 A1 | 8/2017 | Pendyaia |
| 2017/0262429 A1 | 9/2017 | Harper |
| 2017/0262530 A1 | 9/2017 | Okura |
| 2017/0293610 A1 | 10/2017 | Tran |
| 2018/0082183 A1 | 3/2018 | Hertz et al. |
| 2018/0115644 A1 | 4/2018 | Al-Khaja |
| 2018/0144250 A1 | 5/2018 | Kwon |
| 2018/0150459 A1 | 5/2018 | Farid |
| 2018/0165847 A1* | 6/2018 | Broadbent ......... G06Q 10/0637 |
| 2018/0288098 A1 | 10/2018 | Wang |
| 2018/0300310 A1 | 10/2018 | Shinn |
| 2018/0315000 A1 | 11/2018 | Kulkarni |
| 2018/0315001 A1 | 11/2018 | Garner |
| 2018/0338040 A1 | 11/2018 | Carly |
| 2018/0365772 A1 | 12/2018 | Thompson |
| 2018/0376002 A1 | 12/2018 | Abraham |
| 2019/0042988 A1 | 2/2019 | Brown |
| 2019/0080370 A1 | 3/2019 | Copeland |
| 2019/0188617 A1 | 6/2019 | Copeland |
| 2019/0206400 A1 | 7/2019 | Cui |
| 2019/0220794 A1 | 7/2019 | Kulkarni |
| 2019/0340294 A1 | 11/2019 | Spangler |
| 2019/0370669 A1 | 12/2019 | Pais et al. |
| 2020/0042642 A1 | 2/2020 | Bakis |
| 2020/0097814 A1 | 3/2020 | Devesa |
| 2020/0110835 A1 | 4/2020 | Zhao |
| 2020/0160458 A1 | 5/2020 | Bodin et al. |
| 2020/0184556 A1 | 6/2020 | Cella |
| 2020/0219466 A1* | 7/2020 | Camhi .................. B60K 35/00 |
| 2020/0372016 A1 | 11/2020 | Rogynskyy et al. |
| 2021/0096545 A1* | 4/2021 | Stump ............... G05B 23/0216 |
| 2021/0406964 A1 | 12/2021 | Copeland |

OTHER PUBLICATIONS

Liew. "Strategic integration of knowledge management and customer relationship 1-20 management." In: Journal of Knowledge Management. Jul. 18, 2008 (Jul. 18, 2008) Retrieved on Dec. 25, 2019 (Dec. 25, 2019) from <http://student.bms.1k/GDM/49/Slides/MarManaSampleAssi/MMAsuportingJouArti/13673270810884309.pdf> entire document.

(56) References Cited

OTHER PUBLICATIONS

Tung. "Google's human-sounding AI to answer calls at contact centers." In: ZDNet. Jul. 25, 2018 (Jul. 25, 2018) Retrieved on Dec. 25, 2019 (Dec. 25, 2019) from <https://www.zdnet.com/article/googles-human-sounding-ai-to-answer-calls-at-contact-centers/> entire document.

Wee, T., Perdana, A., & Remy, D. (2019). Data analytics dilemma at alpen hotel. Journal of Information Technology Teaching Cases, 9(2), 58-63. doi:http://dx.doi.org/10.1177/2043886919870543 (Year: 2019).

* cited by examiner

DYNAMIC DASHBOARD ADMINISTRATION

BACKGROUND

Customer Relationship Management ('CRM') is an approach to managing a company's interaction with current and potential customers. CRM often implements data analysis of customers' history with a company to improve business relationships with customers, specifically focusing on customer retention and sales growth. CRM systems often compile data from a range of communication channels, including telephone, email, live chat, text messaging, marketing materials, websites, and social media. Through the CRM approach and the systems used to facilitate it, businesses learn more about their target audiences and how to best address their needs.

Enterprise CRM systems can be huge. Such systems can include data warehouse technology, used to aggregate transaction information, to merge the information with information regarding CRM products and services, and to provide key performance indicators. CRM systems aid managing volatile growth and demand and implement forecasting models that integrate sales history with sales projections. CRM systems track and measure marketing campaigns over multiple networks, tracking customer analysis by customer clicks and sales.

CRM systems are accessed often through a dashboard that provides access to information in the CRM. Such a dashboard may include GUI elements for widgets, applications, contacts, text boxes, email, and so such that the user may interact with the CRM system. Typical dashboards for CRM systems are not configured for or designed for individual users. As such, use of such dashboards results in inefficiencies and less effective results.

DETAILED DESCRIPTION OF EXAMPLE EMBODIMENTS

Figure 1:
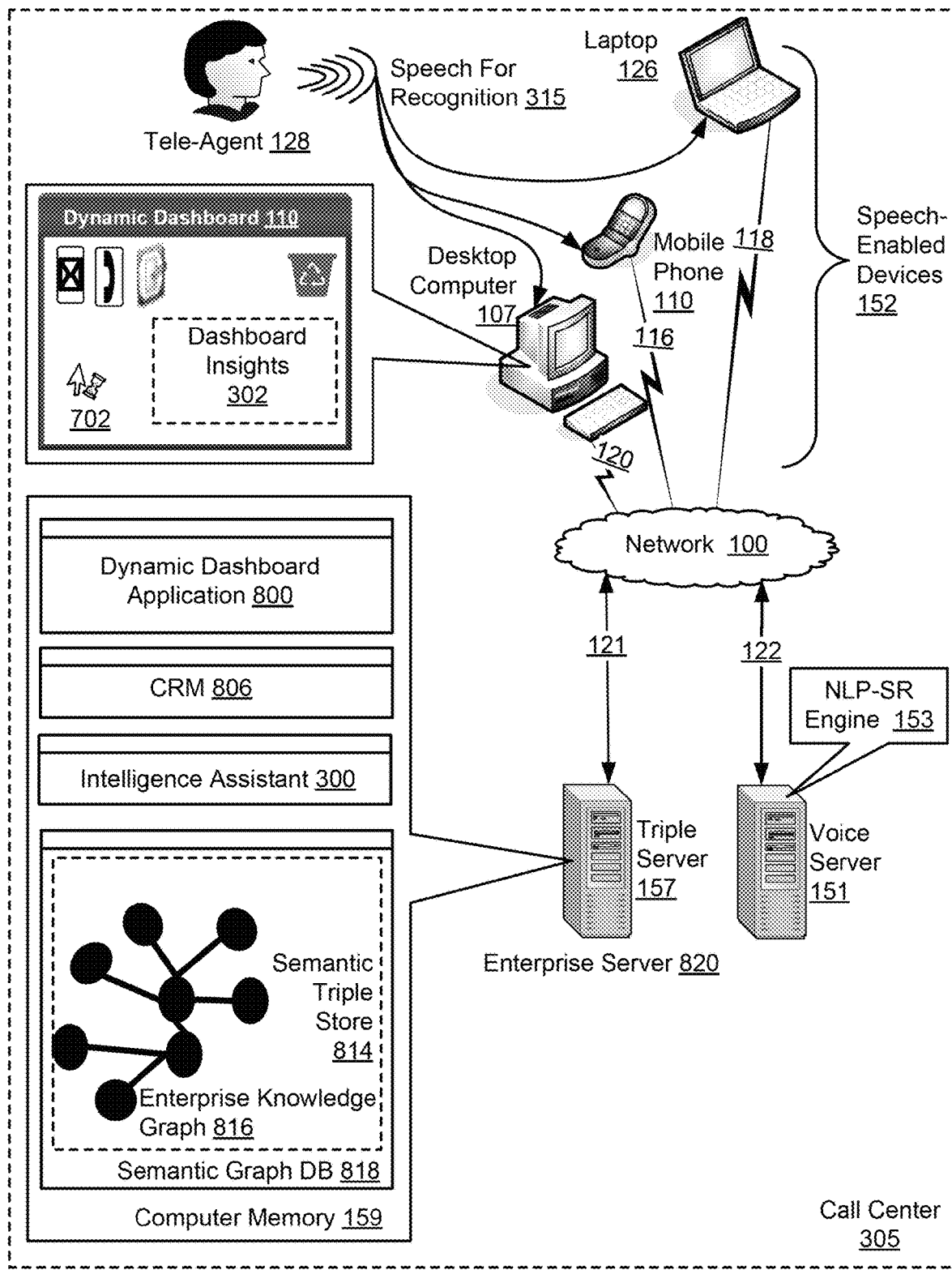
FIG. 1 sets forth a network diagram illustrating an example system for dynamic dashboard administration according to embodiments of the present invention.

Example methods, systems, apparatuses, and products for dynamic dashboard administration are described with reference to the accompanying drawings, beginning with FIG. 1. FIG. 1 sets forth a network diagram illustrating an example system for dynamic dashboard administration according to embodiments of the present invention. The overall example system illustrated in FIG. 1 operates generally for dynamic dashboard administration by displaying a dashboard through a graphical user interface ('GUI'); receiving user instructions to manipulate one or more elements of the dynamic dashboard; capturing the manipulation of the one or more GUI elements; parsing, according to a gesture taxonomy and gesture ontology, the captured manipulation into one or more gesture triples; storing the gesture triples in an enterprise knowledge graph of a semantic graph database. The system of FIG. 1 also operates generally by identifying, in dependence upon the gesture triples, dashboard insights and updating the dashboard in accordance with the dashboard insights. In this manner, the example dashboard of FIG. 1 evolves and is customized through use.

The example of FIG. 1 includes a speech-enabled dynamic dashboard (110) according to embodiments of the present invention operating on a speech enabled device (107). A speech-enabled device is automated computing machinery configured to accept and recognize speech from a user and express to a user voice prompts and speech responses. Speech-enabled devices in the example of FIG. 1 include a desktop computer (107), a mobile phone (110), and a laptop computer (126). Each speech-enabled device in this example is coupled for data communications through network (100) to the triple server (157) and the voice server (151). The desktop computer (107), mobile phone (110), and laptop (126) are connected respectively through wireless connections (120, 116, 118). Each of the wireless connections in the example of FIG. 1 are for explanation and not for limitation. The devices, applications, and other components of FIG. 1 may be coupled for data communications in many ways as will occur to those of skill in the art both wired and wireline.

A word of digitized speech in this example is speech for recognition from a tele-agent (128) or a conversation between the tele-agent (128) and a customer. The speech for recognition can be an entire conversation, where, for example, all persons speaking are in the same room, and the entire conversation is picked up by a microphone on a speech-enabled device. The scope of speech for recognition can be reduced by providing to a speech-enabled device conversation from only to one person or a person on one side of a conversation, as only through a microphone on a headset. The scope of speech for recognition can be reduced even further by providing for recognition only speech that responds to a prompt from, for example, a VoiceXML dialogue executing on a speech-enabled device. As the scope of speech for recognition is reduced, data processing burdens are reduced across the system as a whole, although it remains an option, in some embodiments at least, to recognize entire conversations and stream across flow of all words in the conversation.

Speech from a tele-agent or from a conversation is recognized into digitized speech by operation of a natural language processing speech recognition ("NLP-SR") engine (153), shown here disposed upon a voice server (151), but also amenable to installation on speech-enabled devices. The NLP-SR engine also carries out the parsing of a word of the speech so digitized into a triple of a description logic.

A triple is a three-part statement expressed in a form of logic. Depending on context, different terminologies are used to refer to effectively the same three parts of a statement in a logic. In first order logic, the parts are called constant, unary predicate, and binary predicate. In the Web Ontology Language ("OWL") the parts are individual, class, and property. In some description logics the parts are called individual, concept, and role.

In this example description, the elements of a triple are referred to as subject, predicate, and object—and expressed like this: <subject> <predicate> <object>. There are many modes of expression for triples. Elements of triples can be represented as Uniform Resource Locaters ("URLs"), Uniform Resource Identifiers ("URIs"), or International Resource Identifiers ("IRIs"). Triples can be expressed in N-Quads, Turtle syntax, TriG, Javascript Object Notation or "JSON," the list goes on and on. The expression used here, subject-predicate-object in angle brackets, is one form of abstract syntax, optimized for human readability rather than machine processing, although its substantive content is correct for expression of triples. Using this abstract syntax, here are examples of triples:

<Bob> <is a> <person>
<Bob> <is a friend of> <Alice>
<Bob> <is born on> <the 4$^{th}$ of July 1990>
<Bob> <is interested in> <the Mona Lisa>
<the Mona Lisa> <was created by> <Leonardo da Vinci>
<the video 'La Joconde à Washington'> <is about> <the Mona Lisa>

The same item can be referenced in multiple triples. In this example, Bob is the subject of four triples, and the Mona Lisa is the subject of one triple and the object of two. This ability to have the same item be the subject of one triple and the object of another makes it possible to effect connections among triples, and connected triples form graphs.

The dynamic dashboard (110) of FIG. 1 is coupled for data communications with an enterprise server (820). Operating on the example enterprise server (820) of FIG. 1 is a dynamic dashboard application (800), a customer relationship management ('CRM') system (806), an intelligence assistant (808), and a semantic graph database (818).

The example of FIG. 1 includes a semantic graph database (818) which includes an enterprise knowledge graph (816). A semantic graph is a configuration of memory that uses graph structures, nodes and edges, to represent and store data. A key concept of this kind of configuration is the graph (or edge or relationship), which directly relates data items in a data store. Such a graph database contrasts with more conventional storage such as a logical table, where links among data are mere indirect metadata, and queries search for data within the store using joins to collect related data. Semantic graphs, by design, make explicit relations among data that can be difficult to model in relational systems or logical tables.

In the example of FIG. 1, the semantic graph database (816) includes a semantic triple store (814). The semantic triple store (804) of FIG. 1 includes triple stores for access by the intelligence assistant (300), the CRM (806), and the dynamic dashboard application (800). The triple store (814) of FIG. 1 contains structured definitions of words not special to any particular knowledge domain, where each structured definition of the general language store is implemented with a triple of description logic. The triple store (814) also includes structured definitions of words for recognition in particular knowledge domains such as products, jargon of an industry, particular industries, geographic areas, and so on, where each structured definition of the product triple store is implemented with a triple of description logic. The triple store (814) also includes structured triples of description logic defining gestures from the manipulation of icons in the dynamic dashboard for use in dynamic dashboard administration according to embodiments of the present invention.

The semantic triple store (814) in the example of FIG. 1 includes triples defining various forms of information useful in dynamic dashboard administration according to embodiments of the present invention. Such triples may be queried by an intelligence assistant to retrieve insights in dependence upon stored gesture triples. Such insights are used to update the dynamic dashboard.

As mentioned above, the example of FIG. 1 includes a CRM (806). Such a CRM is a CRM system configured for the use of tele-agents and other users of the enterprise. Often data stored on and accessed by the CRM is data owned by the enterprise itself and collected over time for the use of various users of the organization as will occur to those of skill in the art. In other embodiments of the present invention, the CRM may be owned by a client of the call center and the data residing in that CRM is owned by the client.

The example of FIG. 1 also includes an intelligence assistant (300). The intelligence assistant of FIG. 1 is a speech-enabled platform capable of insight generation and management of the semantic graph database as discussed in more detail below with reference to FIG. 3. The intelligence assistant (300), the CRM (806) and the dynamic dashboard application (800) are connected for data communications to an enterprise server (820), a triple server (157), and a voice server (151).

A dynamic dashboard application (800) is a module of automated computing machinery capable of displaying a dashboard (110) through a graphical user interface ('GUI') and receiving (304) user instructions to manipulate one or more elements of the dynamic dashboard (110). Such user instructions may be implemented with user input devices such as a keyboard and mouse, touchscreen, stylus, or other user input device as will occur to those of skill in the art.

As mentioned above, the dynamic dashboard of FIG. 1 is speech-enabled. User instructions to manipulate one or more elements of the dynamic dashboard may also be in the form of speech received in a speech-enabled device. Such speech may be a direct instruction to manipulate one or more elements of the dashboard for the purposes of modifying the form or function of the dashboard or for the purpose of using the dashboard. In the latter case, the speech is parsed and modifications to the dashboard are inferred from the user's use of the dashboard.

The dynamic dashboard application (800) of FIG. 1 is also capable of capturing the manipulation of the one or more GUI elements. The manipulation of the elements may be captured by capturing a clickstream, mouse movement, input gestures on a touchscreen, digitized speech and other instructions for manipulation as will occur to those of skill in the art. Such manipulations and are parsed and modifications to the dashboard may be inferred from the user's use of the dashboard.

The dynamic dashboard application (800) of FIG. 1 is also capable of parsing, according to a gesture taxonomy and gesture ontology, the captured manipulation into one or more gesture triples and storing the gesture triples in an enterprise knowledge graph (816) of a semantic graph database (818). As mentioned above, a triple is a three-part statement expressed in a form of logic. Depending on context, different terminologies are used to refer to effectively the same three parts of a statement in a logic. Gesture triples represent the manipulation of the GUI elements of the dynamic dashboard. Such triples are used to identify insights which are then used to update the dynamic dashboard.

The dynamic dashboard application (800) of FIG. 1 is also capable of identifying, in dependence upon the gesture triples, dashboard insights. Identifying, in dependence upon the gesture triples, dashboard insights may be carried out by querying the enterprise knowledge graph and inferring insights from the results of the queries. Dashboard insights inform a dynamic dashboard application such that the application may update the dynamic dashboard to improve the form and function of the dashboard for the user.

The dynamic dashboard application (800) of FIG. 1 is also capable of updating (314) the dashboard in accordance with the dashboard insights. Updating (314) the dashboard in accordance with the dashboard insights may include deleting, moving, or changing one or more elements on the dynamic dashboard. Updating the dashboard may result in an evolution of the form and function of the dashboard. As such, through use, the dynamic dashboard adapts to be more efficient and effective for its user.

In the example of FIG. 1, many components useful in dynamic dashboard administration according to embodiments of the present invention are maintained in computer memory (159). In the example of FIG. 1, computer memory (159) includes cache, random access memory ("RAM"), disk storage, and so on, most forms of computer memory. Computer memory (159) so configured typically resides upon speech-enabled devices, or as shown here, upon one or more triple servers (157), voice servers, or enterprise servers (820)

Figure 2:
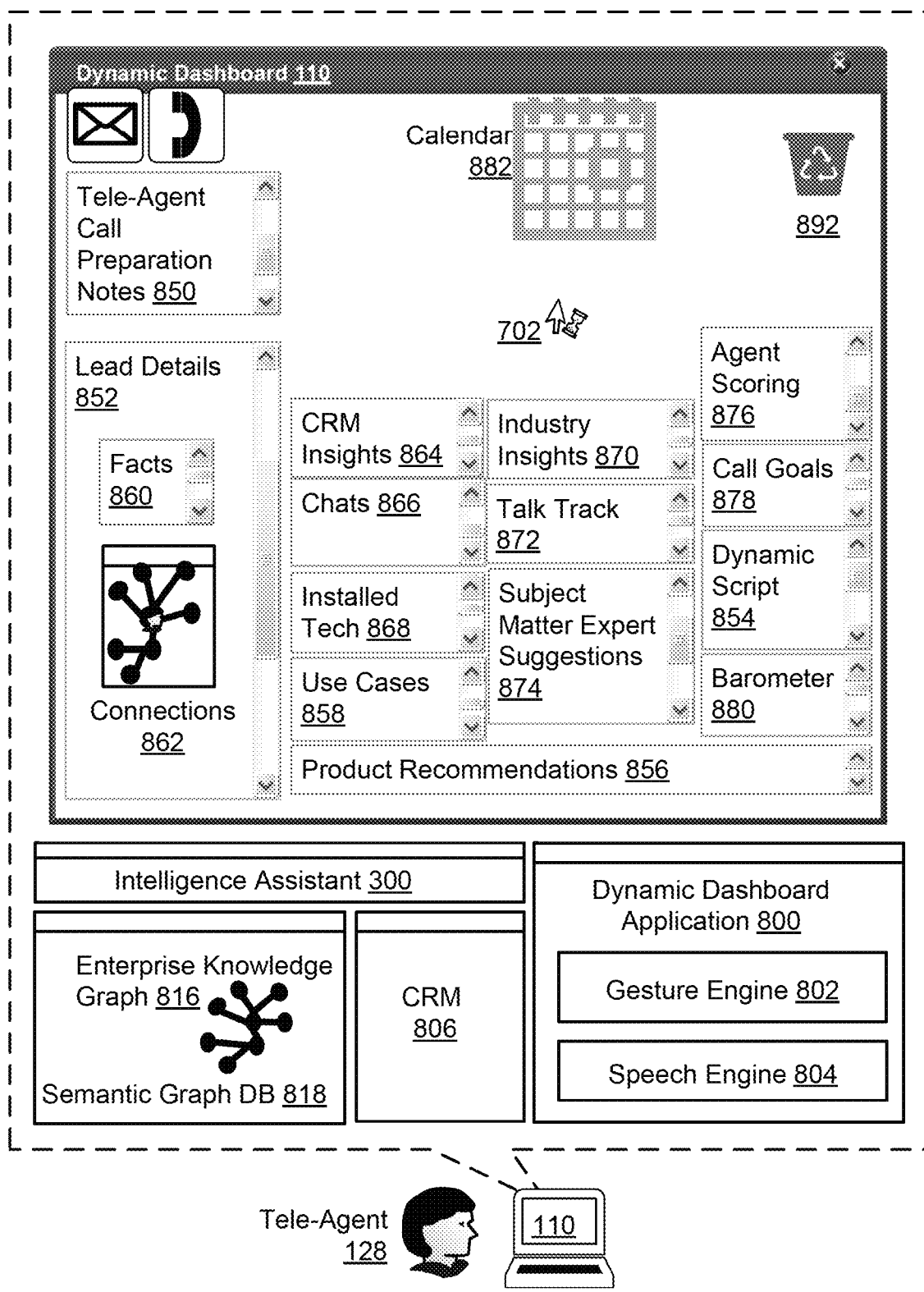
FIG. 2 sets forth a line drawing of an example system for dynamic dashboard administration according to embodiments of the present invention.

For further explanation, FIG. 2 sets forth a line drawing of an example system for dynamic dashboard administration according to embodiments of the present invention. The example of FIG. 2 includes a semantic graph database (818) which includes an enterprise knowledge graph (816). The semantic graph database (818) and enterprise knowledge graph (816) maintains a data store of proprietary and non-proprietary information regarding, among other things, customer information, products that may be discussed between a tele-agent (128) and customers, recommended products for the customer, tele-agent notes for user during the call and so on.

The enterprise knowledge graph (816) of FIG. 2 includes a store of gesture triples parsed from the captured manipulation of one or more elements of the dynamic dashboard. Such captured manipulation may be in the form of a data stream of user input manipulation, text of digitized speech instructions for manipulating the elements, or other captured manipulation as will occur to those of skill in the art. The gesture triples stored in the enterprise knowledge graph of FIG. 2 are useful in identifying insights useful in updating the dynamic dashboard.

The example of FIG. 2 also includes a CRM (806) having a data store of proprietary and non-proprietary information regarding, among other things, customer information, products that may be discussed between a tele-agent (128) and customers, recommended products for the customer, tele-agent notes for user during the call so on as will occur to those of skill in the art.

The example of FIG. 2 includes an intelligence assistant (300), a targeted collection of artificial intelligence-based technologies including natural and semantic language processing that processes unstructured communications into structured information that generates, in dependence upon the structured information, insights for use in updating the dynamic dashboard, ultimately driving improved quality and efficiency of the tele-agent. The intelligence assistant (300) administers the enterprise knowledge graph (816) of the semantic graph database that houses structured data in the form of triples optimized for insight generation.

The example of FIG. 2 includes a dynamic dashboard application (800). The dynamic dashboard application of FIG. 2 is capable of displaying a dashboard (110) through a graphical user interface ('GUI'); receiving user instructions to manipulate one or more elements of the dynamic dashboard (110); capturing the manipulation of the one or more GUI elements; parsing, according to a gesture taxonomy and gesture ontology, the captured manipulation into one or more gesture triples; storing the gesture triples in an enterprise knowledge graph (816) of a semantic graph database (818); identifying, in dependence upon the gesture triples, dashboard insights; and updating (314) the dashboard in accordance with the dashboard insights.

The example of FIG. 2 includes a dynamic dashboard application (800) includes a gesture engine (802) and a speech application (804). The gesture engine (802) of FIG. 2 is a module of automated computing machinery capable of receiving a stream of user manipulation of the dynamic dashboard including manipulation of icons of the dynamic dashboard, user input through widgets of the dynamic dashboard, keystrokes through user input devices and touchscreen, and other user manipulation as will occur to those of skill in the art. The gesture engine records such user manipulations and provides the captured manipulation to the intelligence assistant to parse into gesture triples for insight generation.

The dynamic dashboard application of FIG. 2 also includes a speech engine (804). The example speech engine includes an NLP engine and ASR engine for speech recognition and text-to-speech ('TTS') for generating speech as discussed in more detail below As mentioned above, the dynamic dashboard of FIG. 2 is dynamic because its form and function evolve through updates generated as a result of user interaction with the dashboard. In the example of FIG. 2, the tele-agent is provided real-time customer and product information displayed through the dynamic dashboard (110) for use during the conversation with the customer. In the example of FIG. 2, the speech-enabled dashboard includes a widget for the display of the tele-agent's call preparation notes (850). Such call notes may be prepared or supplemented by the tele-agent before, during, or after a conversation with the customer.

Widgets in this disclosure are implemented as software applications or components that perform one or more particular tasks. Each of the widgets described in this disclosure have an accompanying GUI element as illustrated in FIG. 2. The example widgets and their associated GUI elements are for explanation and not for limitation.

In the example of FIG. 2, the dynamic dashboard (110) includes a widget for the display of the lead details (852) including information describing the customer and customer's business often including name and contact information of the customer, the industry supported by the customer, the locations the customer conducts business, and other useful information that may be included in a listing of facts (860) about the customer. The dynamic dashboard (110) of FIG. 2 also displays a connections image (862) that provides to the tele-agent (128) any known connections between the customer and other customers or people or organizations traced within the CRM (806).

In the example of FIG. 2, the dynamic dashboard (110) includes a widget for the display of a calendar (882) and widget for CRM insights (864) displaying insights regarding the customer known or derived by the CRM (806). In the example of FIG. 2, the dynamic dashboard (110) includes a widget for the display of the technology (858) currently installed in the customer's sites and locations useful in discussing products that are compatible with that installed technology with the customer.

In the example of FIG. 2, the dynamic dashboard (110) includes a widget for the display of use cases (880) describing the product that may be useful to the tele-agent during a conversation with the customer. Often such use cases are provided by clients of the call center to better inform customers about the products the client sells. Similarly, such clients may provide other collateral that may be useful in communicating with the customer and such collateral may come in many forms as will occur to those of skill in the art.

In the example of FIG. 2, the dynamic dashboard (110) includes a widget for the display of product recommendations (852) for the customer and a display of competing products (868) that may be sold by competitors of the tele-agent that are compatible with the currently installed technology already in use by the customer. These product recommendations may be useful to a tele-agent (128) in preparation for or during a conversation with the customer. Such product recommendations may be provided by the semantic graph database (816), the CRM (806), the intelligence assistant or from other sources as will occur to those of skill in the art.

In the example of FIG. 2, the dynamic dashboard (110) includes a widget for the display of industry insights. Industry insights may include current trends in the customer's industry, newly available products for use in an industry, current news regarding the industry and so on as will occur to those of skill in the art. Such insights may be stored and managed by the semantic graph database (816), the CRM (806), or provided from third parties such as third parties operating industry servers, social media servers, lead servers and many others as will occur to those of skill in the art.

In the example of FIG. 2, the dynamic dashboard (110) includes a widget for the display of a talk track. The talk track includes a campaign specific introduction for a phone call with the customer and optionally additional talking points for the tele-agent. In some cases, a tele-agent may want to customize a talk track to include preferred vernacular, style, and other attributes. The talk track is editable in the example of FIG. 2 by the tele-agent through speech or by use of a keyboard.

In the example of FIG. 2, the dynamic dashboard (110) includes a widget for the display of subject matter expert suggestions (874). Subject matter expert suggestions (874) may be provided in real time or maintained by the semantic graph database (816), the CRM (806), or other sources as will occur to those of skill in the art. Subject matter expert suggestions may be provided by internal subject matter experts or by third-party subject matter experts or in other ways as will occur to those of skill in the art.

In the example of FIG. 2, the dynamic dashboard (110) includes a widget for agent scoring (876). An agent score may represent the tele-agents place along a defined sales cycle of a campaign, the tele-agents rank among other agents in the call center or enterprise, as well as other ways of scoring the tele-agent as will occur to those of skill in the art. Such an agent score may be developed and maintained by the semantic graph database (816), the CRM (806), or other components as will occur to those of skill in the art.

In the example of FIG. 2, the dynamic dashboard (110) includes a widget for the display of call goals (878) for the tele-agent. Such call goals are typically provided by the CRM (806) or the intelligence assistant and are often related to the tele-agents place in a sales cycle defined for the particular campaign.

In the example of FIG. 2, the dynamic dashboard (110) includes a widget for the display of a dynamic script (854) often created in real-time as a guidance and aid for the tele-agent in the conversation with the customer. Such a script may be created by the CRM (806), the intelligence assistant, or other components based upon the current sales campaign, information relating to the customer, historic sales trends, success stories of tele-agents and may other factors as will occur to those of skill in the art.

In the example of FIG. 2, the dynamic dashboard (110) includes a widget for the display of a barometer (860) the barometer is graphic representation or text display providing the tele-agent with an indication of the current performance of the tele-agent servicing a particular sales campaign. Such a barometer may be created by the semantic graph database (816), CRM (806), or other components based on many factors such as the goals of the sales campaign, the performance of the tele-agent or other the tele-agents servicing the sales campaign and many other factors as will occur to those of skill in the art.

The components and widgets presented in the example of FIG. 2 are for explanation and not for limitation. Components and widgets, as well as the functions they perform and information they provide may vary dramatically among various embodiments of the present invention as will occur to those of skill in the art. All such components and widgets whatever their form may be used for dynamic dashboard administration according to various embodiments of the present invention.

Each of the components and widgets of the dynamic dashboard of FIG. 2 may be manipulated, used, or interacted with. Such manipulation, use, or interaction is captured and parsed into gesture triples and used to update the dashboard. As such, the dynamic dashboard of FIG. 2 evolves in form and function to become a more efficient and effective tool for the user.

Figure 3:
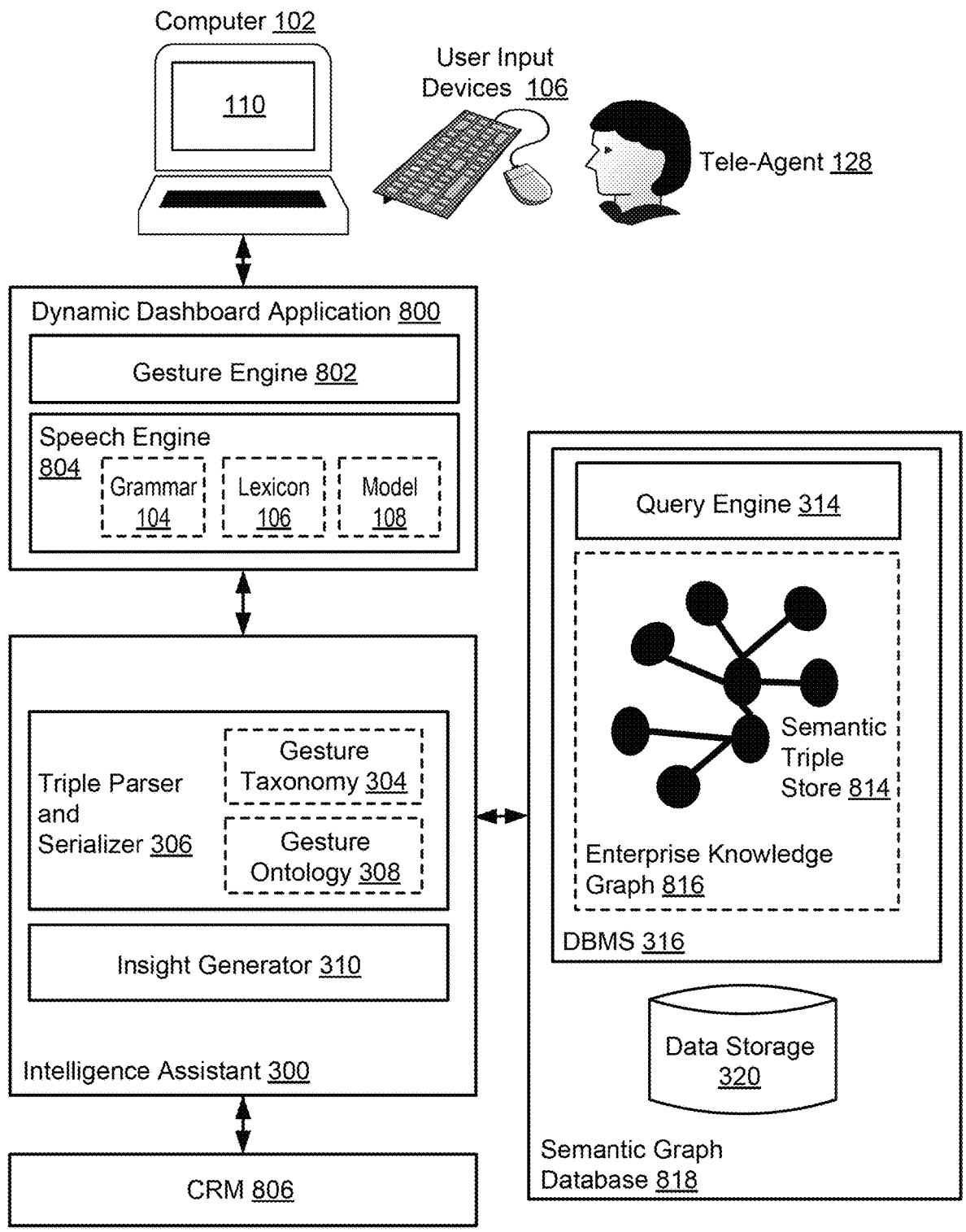
FIG. 3 sets forth a system diagram of a system for dynamic dashboard administration according to embodiments of the present invention.

For further explanation, FIG. 3 sets forth a system diagram illustrating a system for dynamic dashboard administration according to embodiments of the present invention. The system of FIG. 3 includes a dynamic dashboard application (800), a computer (102), a CRM (806), a speech engine (153), an intelligence assistant (300), and a semantic graph database (818) networked for data communications.

The dynamic dashboard application (800) is a module of automated computing machinery configured to display a dashboard through a graphical user interface ('GUI'); receive user instructions to manipulate one or more elements of the dynamic dashboard; capture the manipulation of the one or more GUI elements; parse, according to a gesture taxonomy and gesture ontology, the captured manipulation into one or more gesture triples; store the gesture triples in an enterprise knowledge graph of a semantic graph database; identify, in dependence upon the gesture triples, dashboard insights; and update the dashboard in accordance with the dashboard insights.

The intelligence assistant (300) of FIG. 3 is a targeted collection of artificial intelligence-based technologies including natural and semantic language processing that processes unstructured communications into structured information and generates in dependence upon the structured information and CRM data insights available to the dynamic dashboard application.

The CRM (806) of FIG. 3 is automated computing machinery that provides contact management, sales management, agent productivity administration, and other services targeted to improved customer relations and ultimately customer satisfaction and enterprise profitability. The example CRM of FIG. 3 manages customer relationships across the entire customer lifecycle, individual sales cycles, campaigns, driving marketing, sales, and customer service and so on.

The semantic graph database (818) of FIG. 3 is a type of graph database that is capable of integrating heterogeneous data from many sources and making links between datasets. It focuses on the relationships between entities and is able to infer new knowledge out of existing information. There semantic graph database of FIG. 3 is used to infer or understand the meaning of information. The semantic technology of FIG. 3 can link new information automatically, without manual user intervention or the database being explicitly pre-structured.

The semantic graph database (818) of FIG. 3 includes a database management system 'DBMS' (316) and data storage (320). The DBMS of FIG. 3 includes an enterprise knowledge graph (816) and a query engine (314). The enterprise knowledge graph of FIG. 3 is a structured representation of data stored in data storage (320). The query engine of FIG. 3 receives structured queries and retrieves stored information in response.

Returning to the dynamic dashboard application (800), the dynamic dashboard application of FIG. 3 includes a gesture engine (802) and a speech engine (804). The gesture engine of FIG. 3 is implemented as automated computing machinery configured to capture the manipulation of the one or more GUI elements of the dynamic dashboard. Such manipulation may be through the use of user input devices, gestures on a touchscreen, speech or other manipulation as will occur to those of skill in the art.

The system of FIG. 3 includes a speech engine (804). The example speech engine includes an NLP engine and ASR engine for speech recognition and text-to-speech ('TTS') for generating speech. The example speech engine (153) includes a grammar (104), a lexicon (106), and a language-specific acoustic model (108) as discussed in more detail below.

The intelligence assistant (300) of FIG. 3 includes a triple parser and serializer (306). The triple parser of FIG. 3 takes as input a file in some format such as the standard RDF/XML format, which is compatible with the more widespread XML standard. The triple parser takes such a file as input and converts it into an internal representation of the triples that are expressed in that file. At this point, the triples are stored in the triple store are available for all the operations of that store. Triples parsed and stored in the triple store can be serialized back out using the triple serializer (306).

The triple parser of FIG. 3 creates triples in dependence upon a taxonomy and an ontology. In the case of gesture triples, the triple parser of FIG. 3 creates triples in dependence upon a gesture taxonomy (304) and a gesture ontology (308). The gesture taxonomy (304) includes words or sets of words with defined semantics that will be stored as triples. Such words may descriptions of captured user manipulation of GUI elements of the dynamic dashboard, use of widgets, or speech instructions to the dynamic dashboard. To parse speech into semantic triples the triple parser may receive text converted from speech by the speech engine and identifies portions of that text that correspond with the taxonomy and forms triples using the defined elements of the taxonomy. To parse other gestures into semantic triples the triple parser may receive text describing user manipulation through touchscreen, user input devices and others and forms triples using the defined elements of the taxonomy.

The triple parser of FIG. 3 also creates triples in dependence upon an ontology and in the case of gesture triples, a gesture ontology (308). An ontology is a formal specification that provides sharable and reusable knowledge representation. An ontology specification includes descriptions of concepts and properties in a domain, relationships between concepts, constraints on how the relationships can be used and other concepts and properties.

The intelligence assistant (300) of FIG. 3 includes an insight generator (310). The insight generator (310) of FIG. 3 queries the query engine (314) of the semantic graph database (818) and identifies insights in dependence upon the results of the queries. Such insights may be selected from predefined insights meeting certain criteria of the search results or may be formed from the query results themselves. Such insights may be dashboard insights useful in updating the dynamic dashboard to be more efficient and effective for a tele-agent in preparation for or during a conversation with a customer. Examples of dashboard insights may include widgets that are used often, widgets that are not used, location of icons and GUI elements, making icons and elements larger or smaller, use of a combination of user input and speech and many others as will occur to those of skill in the art. Insight generators according to embodiments of the present invention generate queries using a query language. Query languages may be implemented as an RDF query language such as SPARQL.

Figure 4:
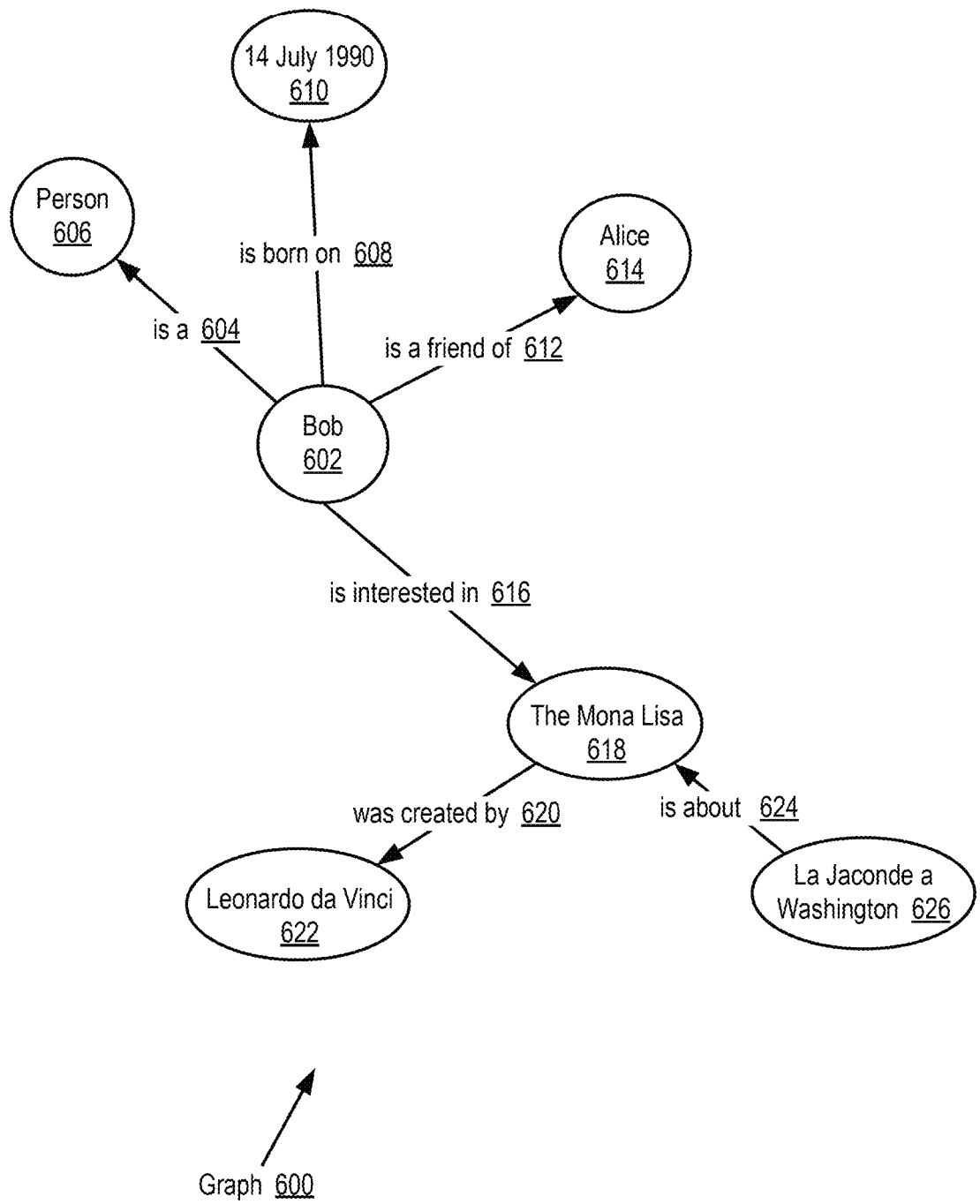
FIG. 4 sets forth a line drawing of a graph.

For further explanation of relations among triples and graphs, FIG. 4 sets forth a line drawing of a graph (600). The example graph of FIG. 4 implements in graph form the example triples set forth above regarding Bob and the Mona Lisa. In the example of FIG. 4, the graph edges (604, 608, 612, 616, 620, 624) represent respectively relations among the node, that is, represent the predicates <is a>, <is a friend of>, <is born on>, <is interested in>, <was created by>, and <is about>. The nodes themselves represent the subjects and objects of the triples, <Bob>, <person>, <Alice>, <the $4^{th}$ of July 1990>, <the Mona Lisa>, <Leonardo da Vinci>, and <the video 'La Joconde à Washington'>.

In systems of knowledge representation, knowledge represented in graphs of triples, including, for example, knowledge representations implemented in Prolog databases, Lisp data structures, or in RDF-oriented ontologies in RDFS, OWL, and other ontology languages. Search and inference are effected against such graphs by search engines configured to execute semantic queries in, for example, Prolog or SPARQL. Prolog is a general-purpose logic programming language. SPARQL is a recursive acronym for "SPARQL Protocol and RDF Query Language." Prolog supports queries against connected triples expressed as statements and rules in a Prolog database. SPARQL supports queries against ontologies expressed in RDFS or OWL or other RDF-oriented ontologies. Regarding Prolog, SPARQL, RDF, and so on, these are examples of technologies explanatory of example embodiments of the present invention. Thus, such are not limitations of the present invention. Knowledge representations useful according to embodiments of the present invention can take many forms as may occur to those of skill in the art, now or in the future, and all such are now and will continue to be well within the scope of the present invention.

A description logic is a member of a family of formal knowledge representation languages. Some description logics are more expressive than propositional logic but less expressive than first-order logic. In contrast to first-order logics, reasoning problems for description logics are usually decidable. Efficient decision procedures therefore can be implemented for problem of search and inference in description logics. There are general, spatial, temporal, spatiotemporal, and fuzzy descriptions logics, and each description logic features a different balance between expressivity and reasoning complexity by supporting different sets of mathematical constructors.

Search queries are disposed along a scale of semantics. A traditional web search, for example, is disposed upon a zero point of that scale, no semantics, no structure. A traditional web search against the keyword "derivative" returns HTML documents discussing the literary concept of derivative works as well as calculus procedures. A traditional web search against the keyword "differential" returns HTML pages describing automobile parts and calculus functions.

Other queries are disposed along mid-points of the scale, some semantics, some structure, not entirely complete. This is actually a current trend in web search. Such systems may be termed executable rather than decidable. From some points of view, decidability is not a primary concern. In many Web applications, for example, data sets are huge, and they simply do not require a 100 percent correct model to analyze data that may have been spidered, scraped, and converted into structure by some heuristic program that itself is imperfect. People use Google because it can find good answers a lot of the time, even if it cannot find perfect answers all the time. In such rough-and-tumble search environments, provable correctness is not a key goal.

Other classes of queries are disposed where correctness of results is key, and decidability enters. A user who is a tele-agent in a data center speaking by phone with an automotive customer discussing a front differential is concerned not to be required to sort through calculus results to find correct terminology. Such a user needs correct definitions of automotive terms, and the user needs query results in conversational real time, that is, for example, within seconds.

In formal logic, a system is decidable if there exists a method such that, for every assertion that can be expressed in terms of the system, the method is capable of deciding whether or not the assertion is valid within the system. In practical terms, a query against a decidable description logic will not loop indefinitely, crash, fail to return an answer, or return a wrong answer. A decidable description logic supports data models or ontologies that are clear, unambiguous, and machine-processable. Undecidable systems do not. A decidable description logic supports algorithms by which a computer system can determine equivalence of classes defined in the logic. Undecidable systems do not. Decidable description logics can be implemented in C, C++, SQL, Lisp, RDF/RDFS/OWL, and so on. In the RDF space, subdivisions of OWL vary in decidability. Full OWL does not support decidability. OWL DL does.

Figure 5:
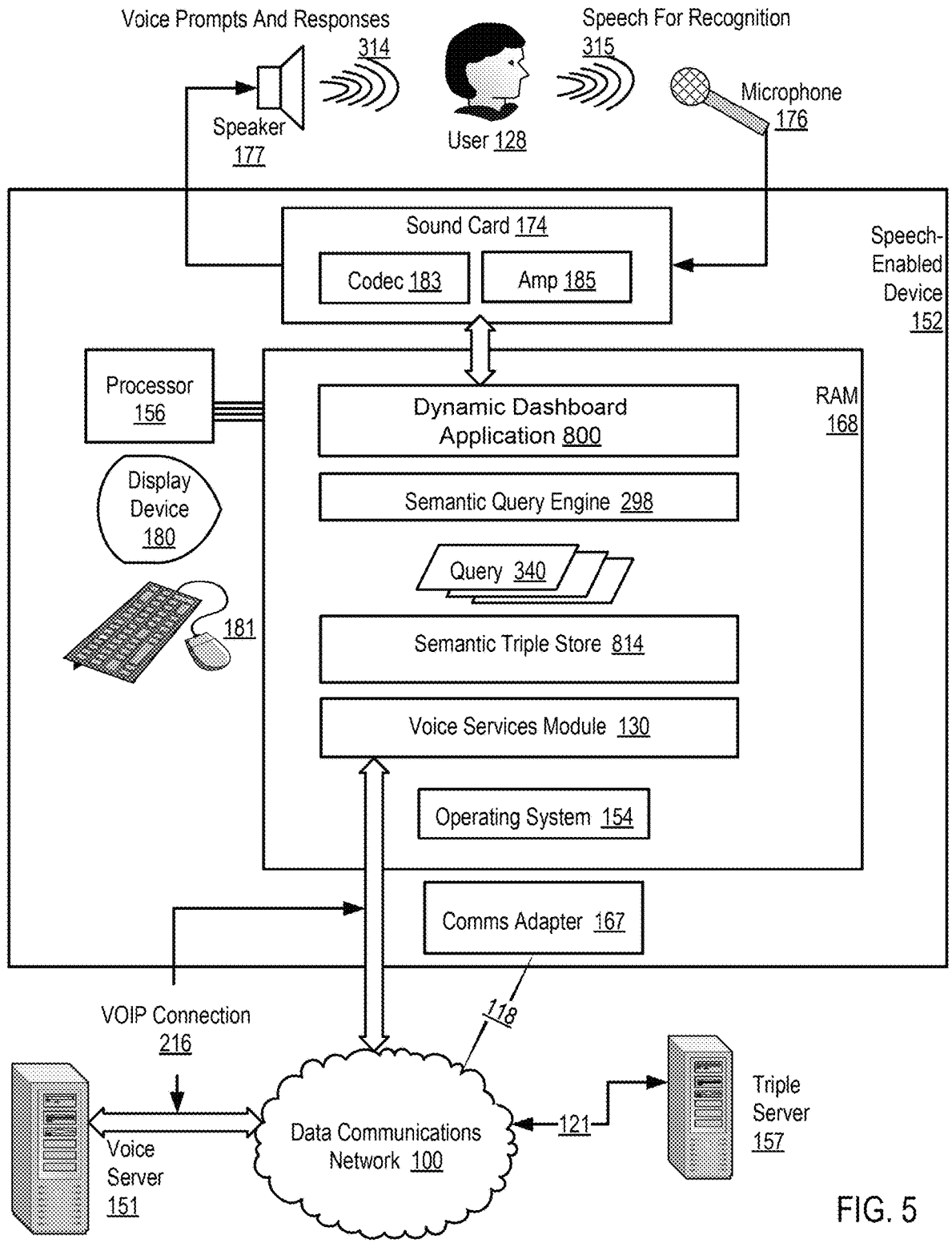
FIG. 5 sets forth a functional block diagram of an example apparatus for dynamic dashboard administration according to embodiments of the present invention.

For further explanation, FIG. 5 sets forth a functional block diagram of example apparatus for dynamic dashboard administration in a thin-client architecture according to embodiments of the present invention. A thin-client architecture is a client-server architecture in which at least some of, perhaps most of, perhaps all of, speech processing and triple processing is off-loaded from the client to servers. Thinness of a thin client varies. The speech-enabled device in the example of FIG. 5 is a thin client in which most speech processing is off-loaded to a voice server (151). The speech-enabled device (152) accepts voice input (315, 176), but then transfers the voice input through a VOIP connection (216) to the voice server (151) where all speech processing is performed. The speech-enabled device in this example does implement some capacity for triple processing (323, 325) and query execution (298), but none of that would be absolutely necessary in a thin client. Devices with reduced storage capacity, a smartwatch or a mobile phone for example, can be implemented with no semantic query engine (298) and no triple store (323, 325), merely passing queries through to a triple server (157) that itself carries out all triple storage and all query processing.

In the particular example of FIG. 5, the speech-enabled device occupies the middle ground of thin-client architecture. It supports little speech processing, but it does support some triple processing. The speech-enabled device in this example performs triple processing and query execution only against triple stores in RAM (168), leaving large-scale storage to the triple server (157). The semantic query engine loads the triple stores as needed to respond to queries. Thus, there are query misses. When the semantic query engine cannot satisfy a query with the triple stores in RAM, it does not conclude failure. Instead, it passes the query to the triple server, and, if the triple server can satisfy the query by use of triples on the server, it passes back to the speech-enabled device both the query results and the triples that satisfied the query, which triples are then stored in RAM on the speech-enabled device for use against similar queries in the future. Over time, such an architecture builds on the speech-enabled device query stores containing frequently useful triples and reduced the need for costly query trips across the network to the triple server—while at the same time functioning with a relatively thin layer of computing resources on the client side. This is a compromise between the extremely thin client with no triple storage at all and the thick client described below with regard to FIG. 8.

The example apparatus of FIG. 5 includes a speech-enabled device (152) and a voice server (151) connected for data communication by a VOIP connection (216) through a data communications network (100). A speech-enabled dynamic dashboard application (800) runs on the speech-enabled device (152). The speech-enabled application may be implemented as a set or sequence of X+V or SALT documents that execute on a speech-enabled browser, a Java Voice application that executes on a Java Virtual Machine, or a speech-enabled application implemented in other technologies as may occur to those of skill in the art. The example speech-enabled device of FIG. 5 also includes a sound card (174), which is an example of an I/O adapter specially designed for accepting analog audio signals from a microphone (176) and converting the audio analog signals to digital form for further processing by a codec (183).

VOIP stands for 'Voice Over Internet Protocol,' a generic term for routing speech over an IP-based data communications network. The speech data flows over a general-purpose packet-switched data communications network, instead of traditional dedicated, circuit-switched voice transmission lines. Protocols used to carry voice signals over the IP data communications network are commonly referred to as 'Voice over IP' or 'VOIP' protocols. VOIP traffic may be deployed on any IP data communications network, including data communications networks lacking a connection to the rest of the Internet, for instance on a private building-wide local area data communications network or 'LAN.'

Many protocols may be used to effect VOIP, including, for example, types of VOIP effected with the IETF's Session Initiation Protocol ('SIP') and the ITU's protocol known as 'H.323.' SIP clients use TCP and UDP port 5060 to connect to SIP servers. SIP itself is used to set up and tear down calls for speech transmission. VOIP with SIP then uses RTP for transmitting the actual encoded speech. Similarly, H.323 is an umbrella recommendation from the standards branch of the International Telecommunications Union that defines protocols to provide audio-visual communication sessions on any packet data communications network.

A speech-enabled application is typically a user-level, speech-enabled, client-side computer program that presents a voice interface to user (128), provides audio prompts and responses (314), and accepts input speech for recognition (315). Voice server (151) provides voice recognition services for speech-enabled devices by accepting dialog instructions, VoiceXML segments, or the like, and returning speech recognition results, including text representing recognized speech, text for use as variable values in dialogs, and output from execution of semantic interpretation scripts as well as voice prompts. Voice server (151) includes computer programs that provide text-to-speech ('TTS') conversion for voice prompts and voice responses to user input in speech-enabled applications such as, for example, X+V applications, SALT applications, or Java Speech applications.

The speech-enabled device (152) in the example of FIG. 5 includes a semantic query engine (298), a module of automated computing machinery that accepts from the speech-enabled application (195) and executes against triple stores (323, 325) semantic queries (340). The speech-enabled application (195) formulates semantic queries with user input from speech (315), GUI, keyboard, mouse (180, 181), or the like. A semantic query is a query designed and implemented against structured data. Semantic queries utilize logical operators, namespaces, pattern matching, subclassing, transitive relations, semantic rules, and contextual full text search. Semantic queries work on named graphs, linked data, or triples. In embodiments of the present invention, triples typically are linked so as to form graphs. This enables a semantic query to process actual relationships between items of information and infer answers from the network of data.

Example formulations of semantic queries are in C, C++, Java, Prolog, Lisp, and so on. The semantic web technology stack of the W3C, for example, offers SPARQL to formulate semantic queries in a syntax similar to SQL. Semantic queries are used against data structured in triple stores, graph databases, semantic wikis, natural language, and artificial intelligence systems. As mentioned, semantic queries work on structured data, and in the particular examples of the present case, the structured data is words described and defined in semantic triples connected in ways that conform to a description logic. In many embodiments of the present invention, semantic queries are asserted against data structured according to a description logic that implements decidability.

In the example apparatus of FIG. 5, the speech-enabled device is coupled for data communication through a communications adapter (167), wireless connection (118), data communications network (100), and wireline connection (121) to a triple server (157). The triple server (157) provides large volume backup for triple stores (323, 325). The triple server is a configuration of automated computing machinery that serializes triples and stores serialized triples in relational databases, tables, files, or the like. The triple server retrieves upon request from non-volatile storage such serialized triples, parses the serialized triples into triple stores, and provides such triple stores upon request to speech-enabled devices for use in systems that utilize the triples in configuring computer memory according to embodiments of the present invention.

Dynamic dashboard administration according to embodiments of the present invention, particularly in a thin-client architecture, may be implemented with one or more voice servers. A voice server is a computer, that is, automated computing machinery, that provides speech recognition and speech synthesis. For further explanation, therefore, FIG. 6 sets forth a block diagram of automated computing machinery comprising an example of a computer useful as a voice server (151) for a speech-enabled device useful in dynamic dashboard administration according to embodiments of the present invention. The voice server (151) of FIG. 6 includes at least one computer processor (156) or 'CPU' as well as random access memory (168) ('RAM') which is connected through a high-speed memory bus (166) and bus adapter (158) to processor (156) and to other components of the voice server.

Stored in RAM (168) is a voice server application (188), a module of computer program instructions capable of operating a voice server in a system that is configured for use in configuring memory according to some embodiments of the present invention. Voice server application (188) provides voice recognition services for multimodal devices by accepting requests for speech recognition and returning speech recognition results, including text representing recognized speech, text for use as variable values in dialogs, and text as string representations of scripts for semantic interpretation. Voice server application (188) also includes computer program instructions that provide text-to-speech ('TTS') conversion for voice prompts and voice responses to user input in speech-enabled applications such as, for example, speech-enabled browsers, X+V applications, SALT applications, or Java Speech applications, and so on.

Voice server application (188) may be implemented as a web server, implemented in Java, C++, Python, Perl, or any language that supports X+V, SALT, VoiceXML, or other speech-enabled languages, by providing responses to HTTP requests from X+V clients, SALT clients, Java Speech clients, or other speech-enabled client devices. Voice server application (188) may, for a further example, be implemented as a Java server that runs on a Java Virtual Machine (102) and supports a Java voice framework by providing responses to HTTP requests from Java client applications running on speech-enabled devices. And voice server applications that support embodiments of the present invention may be implemented in other ways as may occur to those of skill in the art, and all such ways are well within the scope of the present invention.

The voice server (151) in this example includes a natural language processing speech recognition ("NLP-SR") engine (153). An NLP-SR engine is sometimes referred to in this paper simply as a 'speech engine.' A speech engine is a functional module, typically a software module, although it may include specialized hardware also, that does the work of recognizing and generating human speech. In this example, the speech engine (153) is a natural language processing speech engine that includes a natural language processing ("NLP") engine (155). The NLP engine accepts recognized speech from an automated speech recognition ('ASR') engine, processes the recognized speech into parts of speech, subject, predicates, object, and so on, and then converts the recognized, processed parts of speech into semantic triples for inclusion in triple stores.

The speech engine (153) includes an automated speech recognition ('ASR') engine for speech recognition and a text-to-speech ('TTS') engine for generating speech. The speech engine also includes a grammar (104), a lexicon (106), and a language-specific acoustic model (108). The language-specific acoustic model (108) is a data structure, a table or database, for example, that associates speech feature vectors ('SFVs') with phonemes representing pronunciations of words in a human language often stored in a vocabulary file. The lexicon (106) is an association of words in text form with phonemes representing pronunciations of each word; the lexicon effectively identifies words that are capable of recognition by an ASR engine. Also stored in RAM (168) is a Text-To-Speech ('TTS') Engine (194), a module of computer program instructions that accepts text as input and returns the same text in the form of digitally encoded speech, for use in providing speech as prompts for and responses to users of speech-enabled systems.

The grammar (104) communicates to the ASR engine (150) the words and sequences of words that currently may be recognized. For further explanation, distinguish the purpose of the grammar and the purpose of the lexicon. The lexicon associates with phonemes all the words that the ASR engine can recognize. The grammar communicates the words currently eligible for recognition. The two sets at any particular time may not be the same.

Grammars may be expressed in a number of formats supported by ASR engines, including, for example, the Java Speech Grammar Format ('JSGF'), the format of the W3C Speech Recognition Grammar Specification ('SRGS'), the Augmented Backus-Naur Format ('ABNF') from the IETF's RFC2234, in the form of a stochastic grammar as described in the W3C's Stochastic Language Models (N-Gram) Specification, and in other grammar formats as may occur to those of skill in the art. Grammars typically operate as elements of dialogs, such as, for example, a VoiceXML <menu> or an X+V <form>. A grammar's definition may be expressed in-line in a dialog. Or the grammar may be implemented externally in a separate grammar document and referenced from with a dialog with a URI. Here is an example of a grammar expressed in JSFG:

```
<grammar scope="dialog"><![CDATA[
  #JSGF V1.0;
  grammar command;
  <command>=[remind me to] call|phone|telephone
      <name> <when>;
  <name>=bob|martha|joe|pete|chris|john|harold;
  <when>=today|this afternoon|tomorrow|next week;
]]>
</grammar>
```

In this example, the elements named <command>, <name>, and <when> are rules of the grammar. Rules are a combination of a rulename and an expansion of a rule that advises an ASR engine or a voice interpreter which words presently can be recognized. In this example, expansion includes conjunction and disjunction, and the vertical bars '|' mean 'or.' An ASR engine or a voice interpreter processes the rules in sequence, first <command>, then <name>, then <when>. The <command> rule accepts for recognition 'call' or 'phone' or 'telephone' plus, that is, in conjunction with, whatever is returned from the <name> rule and the <when> rule. The <name> rule accepts 'bob' or 'martha' or 'joe' or 'pete' or 'chris' or 'john' or 'harold', and the <when> rule accepts 'today' or 'this afternoon' or 'tomorrow' or 'next week.' The command grammar as a whole matches utterances like these, for example:

"phone bob next week,"
"telephone martha this afternoon,"
"remind me to call chris tomorrow," and
"remind me to phone pete today."

The voice server application (188) in this example is configured to receive, from a speech-enabled client device located remotely across a network from the voice server, digitized speech for recognition from a user and pass the speech along to the ASR engine (150) for recognition. ASR engine (150) is a module of computer program instructions, also stored in RAM in this example. In carrying out automated speech recognition, the ASR engine receives speech for recognition in the form of at least one digitized word and uses frequency components of the digitized word to derive a speech feature vector or SFV. An SFV may be defined, for example, by the first twelve or thirteen Fourier or frequency domain components of a sample of digitized speech. The ASR engine can use the SFV to infer phonemes for the word from the language-specific acoustic model (108). The ASR engine then uses the phonemes to find the word in the lexicon (106).

Also stored in RAM is a VoiceXML interpreter (192), a module of computer program instructions that processes VoiceXML grammars. VoiceXML input to VoiceXML interpreter (192) may originate, for example, from VoiceXML clients running remotely on speech-enabled devices, from X+V clients running remotely on speech-enabled devices, from SALT clients running on speech-enabled devices, from Java client applications running remotely on multimedia devices, and so on. In this example, VoiceXML interpreter (192) interprets and executes VoiceXML segments representing voice dialog instructions received from remote speech-enabled devices and provided to VoiceXML interpreter (192) through voice server application (188).

A speech-enabled application in a thin-client architecture may provide voice dialog instructions, VoiceXML segments, VoiceXML <form> elements, and the like, to VoiceXML interpreter (149) through data communications across a network with such a speech-enabled application. The voice dialog instructions include one or more grammars, data input elements, event handlers, and so on, that advise the VoiceXML interpreter how to administer voice input from a user and voice prompts and responses to be presented to a user. The VoiceXML interpreter administers such dialogs by processing the dialog instructions sequentially in accordance with a VoiceXML Form Interpretation Algorithm ('FIA') (193). The VoiceXML interpreter interprets VoiceXML dialogs provided to the VoiceXML interpreter by a speech-enabled application.

As mentioned above, a Form Interpretation Algorithm ('FIA') drives the interaction between the user and a speech-enabled application. The FIA is generally responsible for selecting and playing one or more speech prompts, collecting a user input, either a response that fills in one or more input items, or a throwing of some event, and interpreting actions that pertained to the newly filled-in input items. The FIA also handles speech-enabled application initialization, grammar activation and deactivation, entering and leaving forms with matching utterances and many other tasks. The FIA also maintains an internal prompt counter that is increased with each attempt to provoke a response from a user. That is, with each failed attempt to prompt a matching speech response from a user an internal prompt counter is incremented.

Also stored in RAM (168) is an operating system (154). Operating systems useful in voice servers according to embodiments of the present invention include UNIX™, Linux™, Microsoft NT™, AIX™, IBM's i5/OS™, and others as will occur to those of skill in the art. Operating system (154), voice server application (188), VoiceXML interpreter (192), ASR engine (150), JVM (102), and TTS Engine (194) in the example of FIG. 5 are shown in RAM (168), but many components of such software typically are stored in non-volatile memory also, for example, on a disk drive (170).

Figure 6:
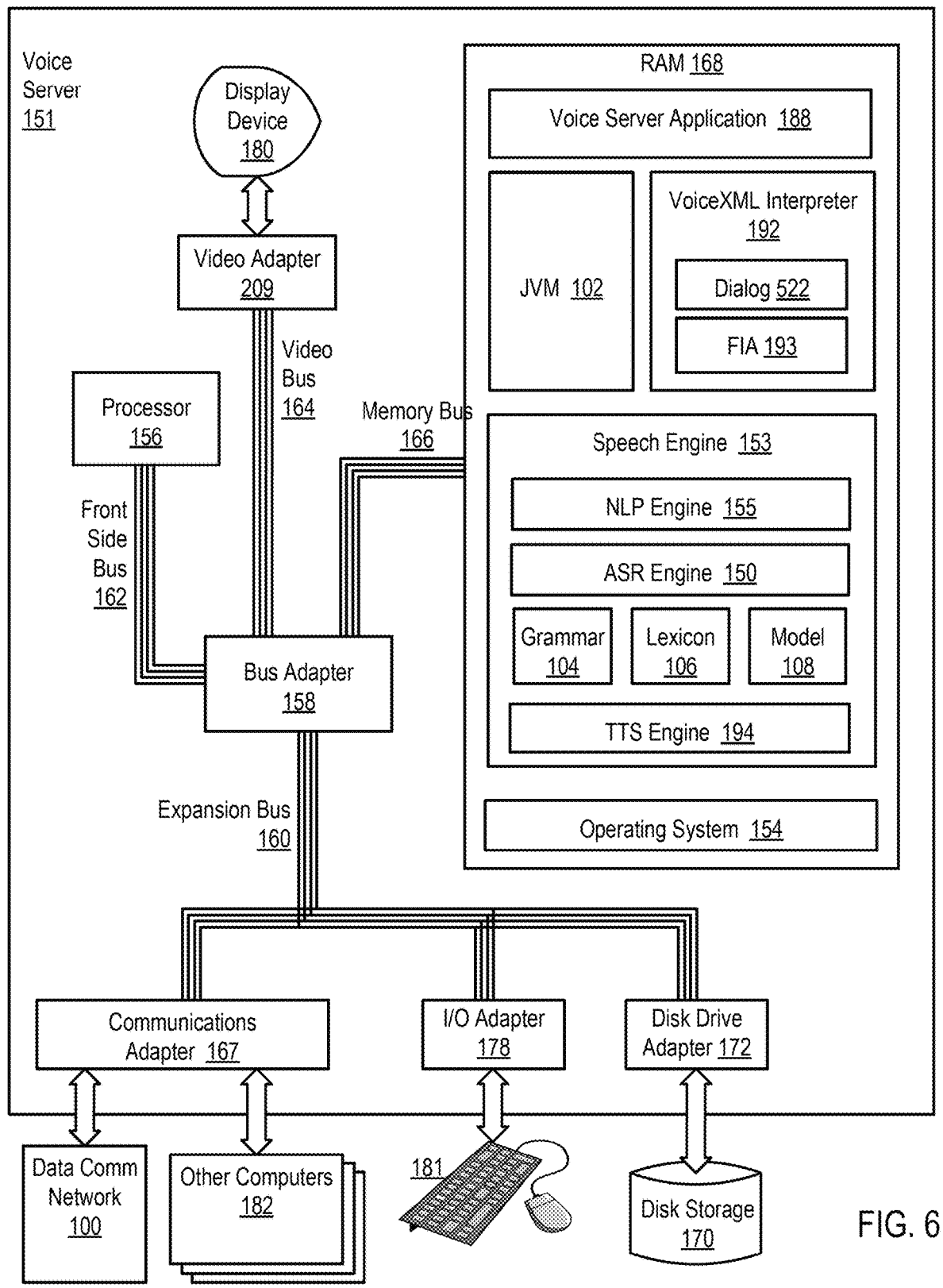
FIG. 6 sets forth a block diagram of automated computing machinery comprising an example of a computer useful as a voice server for a speech-enabled device useful in dynamic dashboard administration according to embodiments of the present invention.

Voice server (151) of FIG. 6 includes bus adapter (158), a computer hardware component that contains drive electronics for high-speed buses, the front side bus (162), the video bus (164), and the memory bus (166), as well as drive electronics for the slower expansion bus (160). Examples of bus adapters useful in voice servers according to embodiments of the present invention include the Intel Northbridge, the Intel Memory Controller Hub, the Intel Southbridge, and the Intel I/O Controller Hub. Examples of expansion buses useful in voice servers according to embodiments of the present invention include Industry Standard Architecture ('ISA') buses and Peripheral Component Interconnect ('PCI') buses.

Voice server (151) of FIG. 6 includes disk drive adapter (172) coupled through expansion bus (160) and bus adapter (158) to processor (156) and other components of the voice server (151). Disk drive adapter (172) connects non-volatile data storage to the voice server (151) in the form of disk drive (170). Disk drive adapters useful in voice servers include Integrated Drive Electronics ('IDE') adapters, Small Computer System Interface ('SCSI') adapters, and others as will occur to those of skill in the art. In addition, non-volatile computer memory may be implemented for a voice server as an optical disk drive, electrically erasable programmable read-only memory (so-called 'EEPROM' or 'Flash' memory), RAM drives, and so on, as will occur to those of skill in the art.

The example voice server of FIG. 6 includes one or more input/output ('I/O') adapters (178). I/O adapters in voice servers implement user-oriented input/output through, for example, software drivers and computer hardware for controlling output to display devices such as computer display screens, as well as user input from user input devices (181) such as keyboards and mice. The example voice server of FIG. 5 includes a video adapter (209), which is an example of an I/O adapter specially designed for graphic output to a display device (180) such as a display screen or computer monitor. Video adapter (209) is connected to processor (156) through a high-speed video bus (164), bus adapter (158), and the front side bus (162), which is also a high-speed bus.

The example voice server (151) of FIG. 6 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for embodiments of the present invention include modems for wired dial-up communications, Ethernet (IEEE 802.3) adapters for wired data communications network communications, and 802.11 adapters for wireless data communications network communications.

Figure 7:
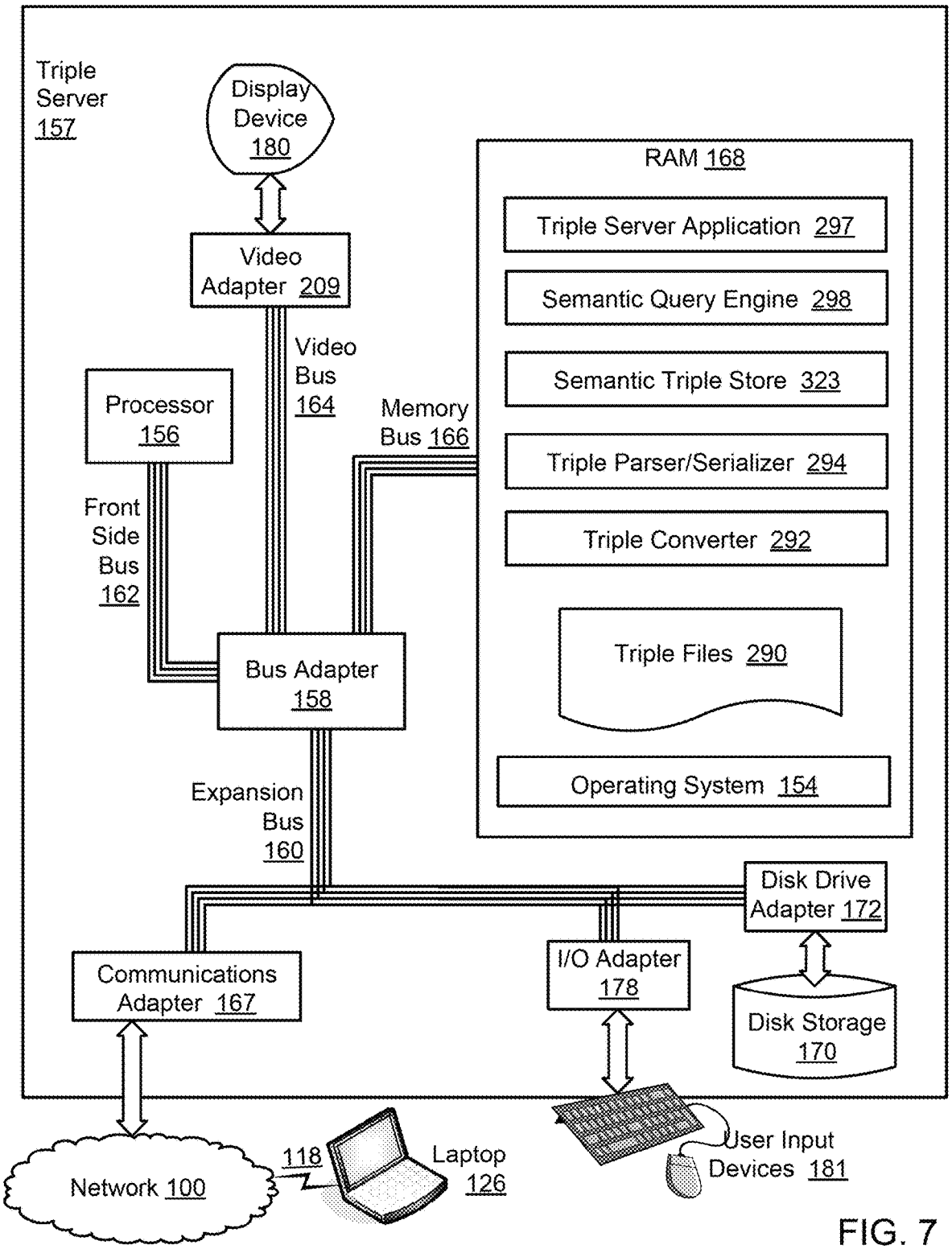
FIG. 7 sets forth a block diagram of automated computing machinery comprising an example of a computer useful as a triple server according to embodiments of the present invention.

For further explanation, FIG. 7 sets forth a block diagram of automated computing machinery comprising an example of a computer useful as a triple server (157) for dynamic dashboard administration according to embodiments of the present invention. The triple server (157) of FIG. 7 includes at least one computer processor (156) or 'CPU' as well as random access memory (168) ('RAM') which is connected through a high-speed memory bus (166) and bus adapter (158) to processor (156) and to other components of the triple server. The processor is connected through a video bus (164) to a video adapter (209) and a computer display (180). The processor is connected through an expansion bus (160) to a communications adapter (167), an I/O adapter (178), and a disk drive adapter (172). The processor is connected to a speech-enabled laptop (126) through data communications network (100) and wireless connection (118). Disposed in RAM is an operating system (154).

Also disposed in RAM are a triple server application program (297), a semantic query engine (298), a semantic triple store (814), a triple parser/serializer (294), a triple converter (292), and one or more triple files (290). The triple server application program (297) accepts, through network (100) from speech-enabled devices such as laptop (126), semantic queries that it passes to the semantic query engine (298) for execution against the triple stores (323, 325).

The triple parser/serializer (294) administers the transfer of triples between triple stores and various forms of disk storage. The triple parser/serializer (294) accepts as inputs the contents of triple stores and serializes them for output as triple files (290), tables, relational database records, spreadsheets, or the like, for long-term storage in non-volatile memory, such as, for example, a hard disk (170). The triple parser/serializer (294) accepts triple files (290) as inputs and outputs parsed triples into triple stores. In many embodiments, when the triple parser/serializer (294) accepts triple files (290) as inputs and outputs parsed triples into triple stores, the triple parser/serializer stores the output triple stores.

Figure 8:
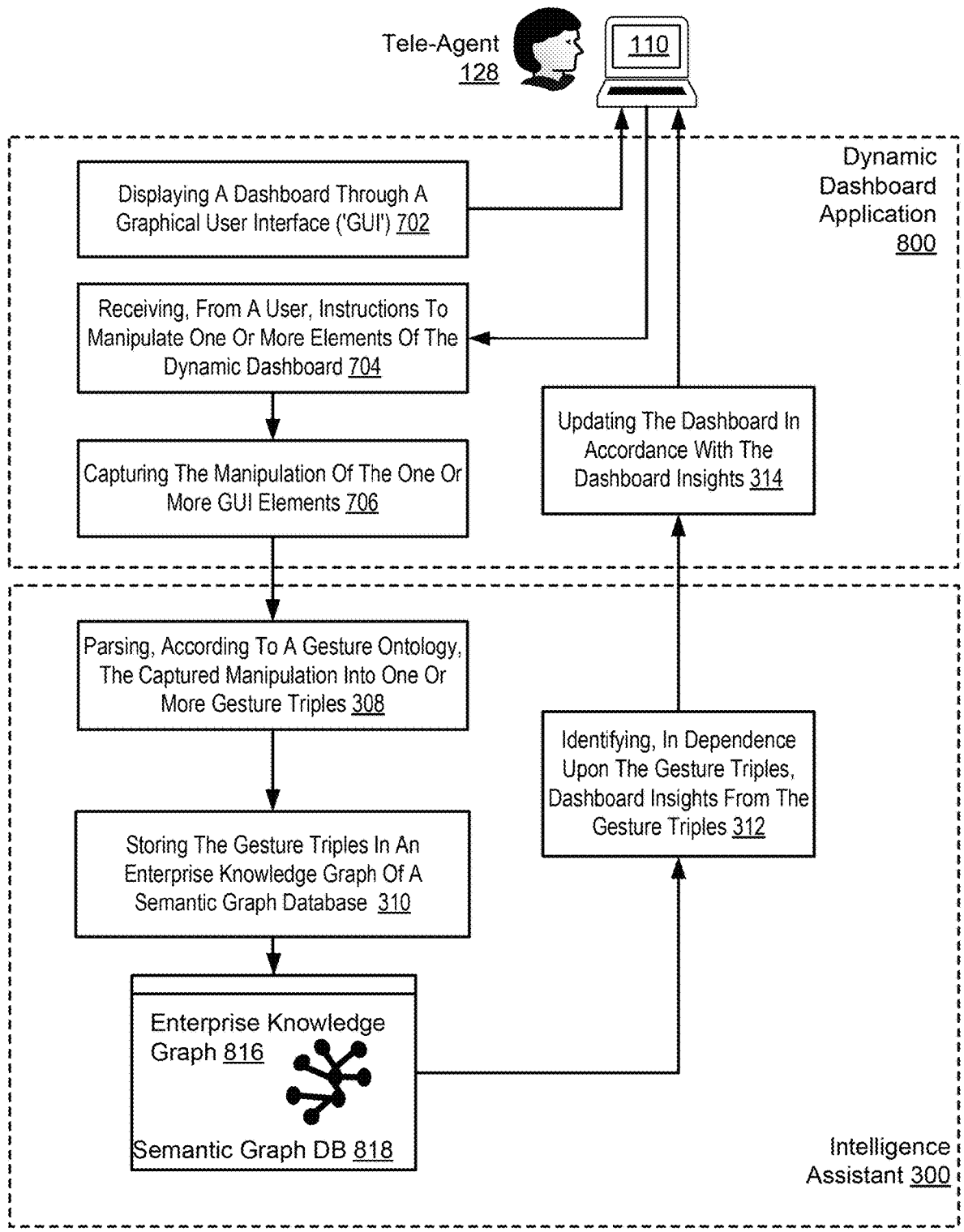
FIG. 8 sets forth a flow chart illustrating an example method for dynamic dashboard administration according to embodiments of the present invention.

For further explanation, FIG. 8 sets forth a flowchart illustrating a method of dynamic dashboard administration according to embodiments of the present invention. The method of FIG. 8 includes displaying (702) a dashboard (110) through a graphical user interface ('GUI'). The dashboard so displayed includes widgets, icons, text and email clients, web access, or other useful tools and information to aid a tele-agent in a conversation with a customer. Such a dashboard is configurable such that the user's interaction with the dashboard provides the information needed to customize the dashboard for the user without ongoing user interaction.

The method of FIG. 8 includes receiving (704) user instructions to manipulate one or more elements of the dynamic dashboard (110). Such instructions to manipulate one of more elements of the dynamic dashboard may not be received from the user or tele-agent with the intention of modifying the dashboard but instead are simply the result of the tele-agent using the dynamic dashboard of the FIG. 8. Alternatively, the instructions to manipulate the one or more elements may be express instructions made with the intent of modifying the dashboard.

Instructions to manipulate one or more elements of the dynamic dashboard may include speech instructions from the user. Such a speech instruction may be in instruction to move an icon, delete an icon, minimize an icon, draft a text message, send an email, find a contact and so on as will occur to those of skill in the art.

Instructions to manipulate one or more elements of the dynamic dashboard may also include gestures on a touch enabled user interface of the dynamic dashboard. Such gestures may include invoking icons and widgets, minimizing, moving or deleting GUI elements, using text and email and so on as will occur to those of skill in the art.

Instructions to manipulate one or more elements of the dynamic dashboard may include instructions to manipulate one or more elements through one or more user input devices. Such instructions may include use of keyboard and mouse to manipulate elements by moving elements, deleting elements, interacting with elements, and other manipulation as will occur to those of skill in the art.

The method of FIG. 8 includes capturing (706) the manipulation of the one or more GUI elements. Capturing (706) the manipulation of the one or more GUI elements may be carried out by capturing digitized speech, capturing a clickstream or stream of user input devices such as keyboard strokes, mouse manipulation, capturing user gestures and other manipulation of GUI elements as will occur to those of skill in the art.

The method of FIG. 8 includes parsing (708), according to a gesture taxonomy and gesture ontology, the captured manipulation into one or more gesture triples and storing (710) the gesture triples in an enterprise knowledge graph (816) of a semantic graph database (818). As mentioned above, a gesture taxonomy includes words or sets of words with defined semantics that will be stored as triples. Such words may descriptions of captured user manipulation of GUI elements of the dynamic dashboard, use of widgets, or speech instructions to the dynamic dashboard.

To parse speech into semantic triples the triple parser receives text converted from speech by the speech engine and identifies portions of that text that correspond with the taxonomy and forms triples using the defined elements of the taxonomy. To parse other gestures into semantic triples the triple parser receives text describing user manipulation through touchscreen, user input devices and others and forms triples using the defined elements of the taxonomy.

A triple parser also creates triples in dependence upon an ontology and in the case of gesture triples, a gesture ontology. An ontology is a formal specification that provides sharable and reusable knowledge representation. An ontology specification includes descriptions of concepts and properties in a domain, relationships between concepts, constraints on how the relationships can be used and other concepts and properties.

The method of FIG. 8 includes identifying (712), in dependence upon the gesture triples, dashboard insights. Dashboard insights are insights as to how a GUI element, widget, or other component of the dynamic dashboard are manipulated or used. Such dashboard insights may include location of an icon, deletion or movement of an icon, manipulation of the size of text or icon or widget used, the frequency of use of a component, and many other insights as will occur to those of skill in the art. Such dashboard insights may usefully provide information that a user is frequently not using one or more elements or tools of the dashboard, often moving such elements, repeatedly deleting such elements and so as will occur to those of skill in the art.

Identifying, in dependence upon the gesture triples, dashboard insights from the gesture triples further comprises querying the semantic graph database. Querying the sematic graph database may be carried out by creating a query such as for example a SPRQL query designed to illicit insights as will occur to those of skill in the art. Such queries may be refined and improved over time in dependence upon insights received, additional information, and other information as will occur to those of skill in the art.

The method of FIG. 8 includes updating (714) the dashboard in accordance with the dashboard insights. Updating (714) the dashboard in accordance with the dashboard insights may be carried out by modifying the presentation of one or more elements of the dashboard, adding GUI elements, deleting one or more GUI elements, moving GUI elements, changing the size of elements, changing the functionality of a elements such that additional or fewer features are exposed through the element and so on as will occur to those of skill in the art.

In some embodiments, the dynamic dashboard may notify the user when the dashboard is modified to inform the user as to how the dashboard has evolved in form or function. Such a notification may usefully keep a user informed of the current state of the dashboard.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of dynamic dashboard administration, the method comprising:

displaying a dynamic dashboard through a graphical user interface ('GUI');

receiving user instructions to interact with a set of GUI elements representing a set of applications for displaying information about a customer, information about an agent, or an interaction between the agent and the customer of the dynamic dashboard;

capturing interactions and uses of the set of GUI elements representing the set of applications;

parsing, according to a gesture taxonomy and gesture ontology, the captured interactions into one or more gesture triples that include one or more structured triples of description logic defining gestures representing manipulation of icons in the displayed dynamic dashboard, wherein the gesture taxonomy includes words describing user manipulations of one or more GUI elements of the set of GUI elements, uses of the application, and speech instructions to the dynamic dashboard;

storing the gesture triples in an enterprise knowledge graph of a semantic graph database;

identifying, at least by querying the semantic graph database storing the gesture triples, dashboard insights pertaining to user-interactions with the set of GUI elements representing the set of applications of the dynamic dashboard, the dashboard insights including: a frequency of use of one or more of the set of applications of the dynamic dashboard by a user, rearrangement of the one or more of the set of GUI elements within the dynamic dashboard by the user, resizing of one or more icons of the one or more GUI elements of the set of GUI elements by the user, deletion of a subset of the set of GUI elements from the dynamic dashboard by the user, and use of a combination of user input and speech; and updating the dynamic dashboard in accordance with the dashboard insights.

2. The method of claim 1 wherein updating the dynamic dashboard in accordance with the dashboard insights includes modifying the presentation of the one or more GUI elements of the set of GUI elements of the dynamic dashboard.

3. The method of claim 1 wherein updating the dynamic dashboard in accordance with the dashboard insights further comprises deleting one or more GUI elements of the set of GUI elements.

4. The method of claim 1 wherein updating the dynamic dashboard in accordance with the dashboard insights further comprises modifying functionality of one or more components of the dynamic dashboard.

5. The method of claim 1 wherein instructions to interact with the set of GUI elements of the dynamic dashboard include speech instructions from a user.

6. The method of claim 1 wherein instructions to interact with the set of GUI elements of the dynamic dashboard include gestures on a touch enabled user interface of the dynamic dashboard.

7. The method of claim 1 wherein instructions to interact with the set of GUI elements of the dynamic dashboard include instructions to manipulate one or more GUI elements through one or more user input devices.

8. The method of claim 1 wherein capturing the interactions and uses of the set of GUI elements further comprises receiving a stream of user input and recording the stream.

9. The method of claim 1 further comprising displaying a notification of an update to the dynamic dashboard.

10. A system for dynamic dashboard administration, the system comprising one or more computer processors and one or more storage devices storing computer programs that when executed by the one or more computer processors, cause the one or more computer processors to perform operations comprising:
   displaying a dynamic dashboard through a graphical user interface ('GUI');
   receiving user instructions to interact with a set of GUI elements representing a set of applications for displaying information about a customer, information about an agent, or an interaction between the agent and the customer of the dynamic dashboard;
   capturing interactions and uses of the set of GUI elements representing the set of applications;
   parsing, according to a gesture taxonomy and gesture ontology, the captured interactions into one or more gesture triples that include one or more structured triples of description logic defining gestures representing manipulation of icons in the displayed dynamic dashboard, wherein the gesture taxonomy includes words describing user manipulations of one or more GUI elements of the set of GUI elements, uses of the application, and speech instructions to the dynamic dashboard;
   storing the gesture triples in an enterprise knowledge graph of a semantic graph database;
   identifying, at least by querying the semantic graph database storing the gesture triples, dashboard insights pertaining to user-interactions with the set of GUI elements representing the set of applications of the dynamic dashboard, the dashboard insights including: a frequency of use of one or more of the set of applications of the dynamic dashboard by a user, rearrangement of the one or more of the set of GUI elements within the dynamic dashboard by the user, resizing of one or more icons of the one or more GUI elements of the set of GUI elements by the user, deletion of a subset of the set of GUI elements from the dynamic dashboard by the user, and use of a combination of user input and speech; and
   updating the dynamic dashboard in accordance with the dashboard insights.

11. The system of claim 10 wherein updating the dynamic dashboard in accordance with the dashboard insights includes modifying the presentation of the one or more GUI elements of the set of GUI elements of the dynamic dashboard.

12. The system of claim 10 wherein updating the dynamic dashboard in accordance with the dashboard insights further comprises deleting one or more GUI elements of the set of GUI elements.

13. The system of claim 10 wherein updating the dynamic dashboard in accordance with the dashboard insights further comprises modifying functionality of one or more components of the dynamic dashboard.

14. The system of claim 10 wherein instructions to interact with the set of GUI elements of the dynamic dashboard include speech instructions from a user.

15. The system of claim 10 wherein instructions to interact with the set of GUI elements of the dynamic dashboard include gestures on a touch enabled user interface of the dynamic dashboard.

16. The system of claim 10 wherein instructions to interact with the set of GUI elements of the dynamic dashboard include instructions to manipulate one or more GUI elements through one or more user input devices.

17. The system of claim 10 wherein capturing the interactions and uses of the set of GUI elements further comprises receiving a stream of user input and recording the stream.

18. The system of claim 10 wherein the stored computer programs further cause the one or more computer processors to display a notification of an update to the dynamic dashboard.

* * * * *